United States Patent [19]

Hoyt et al.

[11] Patent Number: 4,806,584

[45] Date of Patent: Feb. 21, 1989

[54] PHASE TRANSFER COMPOUNDS AS ACCELERATORS OF SOAP/SULFUR VULCANIZATION

[75] Inventors: John M. Hoyt, Cincinnati; Steven D. Blazey, Akron, both of Ohio

[73] Assignee: National Distillers and Chemical Corporation, New York, N.Y.

[21] Appl. No.: 938,668

[22] Filed: Dec. 5, 1986

[51] Int. Cl.$^4$ ............................................. C08K 5/06
[52] U.S. Cl. ................................... 524/376; 524/377; 524/378; 524/545; 524/546; 525/328.9; 525/329.5; 525/331.4; 525/331.5; 525/346
[58] Field of Search ............... 524/545, 546, 376, 377, 524/378; 525/346

[56] References Cited

U.S. PATENT DOCUMENTS

| | | | |
|---|---|---|---|
| 3,875,892 | 4/1975 | Morris | 526/316 |
| 3,910,866 | 10/1975 | Morris | 526/316 |
| 3,912,672 | 10/1975 | Morris et al. | 526/316 |
| 3,919,143 | 11/1975 | Morris | 525/328.6 |
| 3,919,448 | 11/1975 | Dufresne | 524/376 |
| 3,925,281 | 12/1975 | Jorgensen | 526/316 |

*Primary Examiner*—Joseph L. Schofer
*Assistant Examiner*—Bernard Lipman
*Attorney, Agent, or Firm*—Kenneth D. Tremain; Gerald A. Baracka

[57] ABSTRACT

A composition of matter is disclosed comprising (1) a saturated elastomer having an active halogen-containing cure site, (2) a soap/sulfur cure system, and (3) a phase transfer compound. The phase transfer catalyst comprises a quaternary ammonium or phosphonium salt of a mineral acid or an alkylene oxide polymer. The phase transfer compounds accelerate soap/sulfur cures and make it possible to obtain acceptable cure rates with higher fatty acid soaps.

20 Claims, No Drawings

PHASE TRANSFER COMPOUNDS AS ACCELERATORS OF SOAP/SULFUR VULCANIZATION

BACKGROUND OF THE INVENTION

1. Field of the Invention

The present invention relates to a vulcanizable composition containing a saturated elastomer having active halogen-containing cure sites and to the process of vulcanizing same. The elastomer is employed in combination with a soap/sulfur cure system and a phase transfer compound.

2. Description of the Prior Art

Elastomeric polymers have been vulcanized with sulfur in order to improve elasticity, resistance to cold flow and strength. The polymers upon vulcanization lose their tackiness, become insoluble in solvents, and their resistance to deterioration by heat and light is improved. Conventional sulfur vulcanization takes place in elastomers through unsaturation present in the elastomer molecules. The unsaturation is either present when the polymer is formed or may be introduced into the polymer molecules after the polymer is formed by methods that are known in the art.

Ethylene-vinyl acetate copolymers (EVA) may be vulcanized by introducing unsaturation by thermal or catalytic deacetylation with a protonic or Lewis acid under a vacuum of less than about 50 Torr while continuously removing acetic acid released during the deacetylation. A heated vacuum double screw extruder may be used for this purpose and olefinically unsaturated linear polymers produced as described by Bernhardt et al. in U.S. Pat. No. 4,004,069. These polymers may be cross-linked or vulcanized with sulfur according to Bernhardt et al. Ger. Offen. No. 2,413,064.

Vulcanization of saturated acrylic elastomers using a soap/sulfur cure system is also known. Mihal U.S. Pat. No. 3,458,461 discloses the vulcanization of acrylate ester elastomers containing small amounts (approx. 5% or less) of copolymerized vinyl chloroacetate (VCA) units as cure sites using cure systems comprising a soap, such as sodium or potassium stearate, in combination with elemental sulfur. Grafting of mixtures of acrylate esters and vinyl chloroacetate onto EVA elastomers and curing of the resulting grafted polymer products with soap/sulfur systems is described by Chang et al. in U.S. Pat. No. 4,202,845. Kaiserman et al. in U.S. Pat. No. 3,972,857 describe soap/sulfur vulcanization of EVA elastomers containing activated halogen atoms as sites for sulfur vulcanization. The chlorine- or bromine-containing functional groups may be incorporated into the ethylene-vinyl acetate copolymer either by copolymerization of a vinyl monomer containing the functional group with ethylene and vinyl acetate to provide a random terpolymer or by chemically modifying a copolymer of ethylene and vinyl acetate by reaction of the acetate functional group of the copolymer with a chlorine- or bromine-containing reagent. Preferably, the sites are α-chloroacetoxy groups which are substituted for some of the acetoxy groups of the EVA copolymer by acidolysis with chloroacetic acid.

Not all soaps, however, provide equivalent results in soap/sulfur vulcanization. Behrens in U.S. Pat. No. 3,939,128 has shown that soaps of higher fatty acids are four to five times less effective than the sodium or potassium salt of 2-ethylhexanoic acid for the vulcanization of acrylate ester elastomers containing VCA cure sites. Substantially higher states of cure are obtained in a shorter time with the 2-ethylhexanoate soaps than with the corresponding stearate or oleate soaps.

Since 2-ethylhexanoic acid is comparatively expensive compared to the higher fatty acids, e.g., oleic and stearic acid, which are derived from natural fats and oils and since the sodium soap of 2-ethylhexanoic acid is hygroscopic and requires handling under comparatively anhydrous conditions, it would be highly useful if higher fatty acid soaps could be effectively utilized for the vulcanization of saturated acrylic elastomers having active halogen-containing cure sites. It would be even more advantageous if comparable or superior rates of cure could be obtained utilizing the higher fatty soaps and if there were no processing problems associated therewith. These and other advantages are obtained with the compositions of the present invention and the process of vulcanizing these compositions.

SUMMARY OF THE INVENTION

The present invention relates to a composition of matter, vulcanized or unvulcanized, comprising a saturated elastomer having active halogen-containing cure sites, a soap/sulfur cure system, and a phase transfer compound. Other conventional compounding ingredients may also be present in the composition. The invention also relates to a method for vulcanizing saturated elastomers having active halogen-containing cure sites by combining them with a soap/sulfur cure system and a phase transfer compound followed by curing.

It has been discovered according to the present invention that the phase transfer compounds enhance cure rates of soap/sulfur cure systems employed in vulcanizing elastomers containing VCA cure sites. The phase transfer compound may be a quaternary ammonium or phosphonium salt of a mineral acid or a polyalkylene oxide. Although the phase transfer compounds accelerate the rate of cure of virtually all soap/sulfur vulcanization systems, they are most advantageously employed with the slower soap/sulfur cure systems; i.e., those in which the soap is a sodium or potassium salt of relatively high molecular weight monocarboxylic acids. It is particularly advantageous for use with the sodium or potassium soaps of $C_{12-22}$ monocarboxylic acids.

DETAILED DESCRIPTION OF THE INVENTION

The phase transfer compounds of this invention, useful in accelerating the rate of cure of soap/sulfur cure systems for vulcanizing elastomers containing active halogen-containing cure sites, may be a quaternary ammonium salt of a mineral acid, the phosphonium analogs thereof or a polyalkylene oxide. Phase transfer compounds (catalysts) are also well known in the art. In general they promote reactions between reactive moieties separated by phase boundaries [see, for example, W. P. Weber and G. W. Gokel, "Phase Transfer Catalysis in Organic Synthesis," Springer-Verlag, Berlin, 1977 and C. M. Starks, *J. Am. Chem. Soc.*, 93, 195(1971)]. The phase transfer compound is preferably added along with the soap component of the cure system, conveniently diluted with a comparable amount of carbon black reinforcing agent, as the final step of the elastomer compounding process just prior to vulcanization.

The quaternary ammonium and phosphonium salts of mineral acids are represented by the formula:

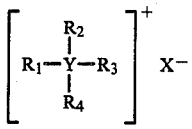

where Y is nitrogen or phosphorus; and $R_1$, $R_2$, $R_3$ and $R_4$ are hydrocarbon radicals containing from 1 to about 18 carbon atoms, which may be alkyl, aryl, aralkyl or alkaryl, and which may be the same or different. The anion $X^-$ is derived from a protonic mineral acid and may be $Cl^-$, $Br^-$, $I^-$, $HSO_4^-$, $H_2PO_4^-$, and the art known equivalents thereof.

Examples of the aforesaid quaternary ammonium salts are tetramethylammonium chloride, tetramethylammonium bromide, tetraethylammonium iodide, tetrabutylammonium bisulfate, benzyltriethylammonium chloride, hexadecyltributylammonium chloride, decyltriethylammonium bromide, myristyltrimethylammonium bromide, octadecyltributylammonium chloride, trioctylpropylammonium chloride, methyltrialkyl ($C_8$–$C_{10}$) ammonium chloride, and the art known equivalents thereof. Phosphonium analogs of the aforementioned quaternary ammonium salts, e.g., hexadecyltributylphosphonium bromide and the like, may also be employed.

The polyalkylene oxides which can be used for the invention contain repeating oxyalkylene moieties

where R is a lower alkylene group having from 2 to 4 carbon atoms and mixtures thereof, and n ranges from about 3 to about 1000 and, more preferably, from about 5 to about 100. The polyalkylene oxide polymer may contain terminal hydroxy and/or lower alkoxy groups such as an alkoxy group having from 1 to about 5 carbon atoms. In one embodiment, R has 2 or 3 carbon atoms. The oxyalkylene moiety may also be a structural feature of more complex molecules, as for example crown ethers, e.g., dicyclohexyl-18-crown-6, or various macrobicyclic aminoethers, e.g., cryptands. Polyethylene glycols, polypropylene glycols and poly(ethylene-propylene) glycols optionally containing terminal lower alkoxy groups where up to about 95 percent of the alkyleneoxy groups may be either an ethyleneoxy or propyleneoxy group are employed as the polyalkylene oxide polymer in one embodiment of the invention.

The amount of phase transfer compound employed will range broadly from about 0.05 to about 7 parts and, more especially, from about 0.5 to about 4 parts per 100 parts of polymer. More than one phase transfer catalyst can be used either as mixtures or added individually during mixing.

All "parts" of the composition as set forth herein are parts by weight unless otherwise indicated. The expression "phr" means parts per 100 parts of elastomer.

The compositions and process of the present invention differ from many phase transfer systems in that no water is employed—the organic elastomer and the compounding ingredients constitute the two phases of the system. While no water is intentionally added, some water in an amount on the order of 0.5% by weight or less may be present. The water may be present in the elastomers as a result of their synthesis by emulsion polymerization in water or may be associated with other ingredients in the composition. For example, some of the sodium salts or soaps of carboxylic acids that may be employed in accord with the invention are hygroscopic and may introduce water into the compound to be vulcanized. Particularly, sodium 2-ethylhexanoate is very hygroscopic and is routinely handled under anhydrous conditions but may still attract water from the air upon being milled into the elastomer compound.

The phase transfer compound is effectively utilized with saturated elastomers having active halogen cure sites. In one embodiment of the invention, the active halogen-containing sites are incorporated into an ethylene-vinyl ester copolymer either by terpolymerizing a vinyl monomer containing the functional group or by chemically modifying the copolymer by reacting a portion of the ester groups with a halogen-containing reagent, such as chloroacetic acid. The ethylene-vinyl ester elastomer contains from about 25 to about 60 weight percent ethylene and from about 35 to about 70 weight percent vinyl ester having from 3 to 6 carbon atoms, e.g., vinyl formate, vinyl acetate, vinyl propionate, vinyl butyrate, and the like. Vinyl acetate is preferred.

The EVA terpolymer elastomers generally contain from 0.2 percent to about 8 percent by weight of an active halogen-containing cure site monomer provided by a member selected from the group consisting of halogenated vinyl esters and vinyl ethers having from 1 to about 3 halogen atoms and from 4 to about 10 carbon atoms. The halogen can be chlorine, bromine and iodine, however, chlorine and bromine are preferred. A particularly useful active halogen containing cure site monomer comprises vinyl chloroacetate in which case the elastomer is an E/VA/VCA terpolymer. Other cure site monomers that may be used include vinylbenzyl chloride and epoxy monomers, such as glycidyl methacrylate and vinyl glycidyl ether.

Useful EVA copolymers and terpolymers are produced by processes known in the art such as those described in Roedel in U.S. Pat. Nos. 2,703,794 and 2,519,791; French, U.S. Pat. No. 3,509,115; and Hanford, U.S. Pat. No. 2,396,785. Elastomeric copolymers and terpolymers with high Mooney viscosities may be prepared by emulsion polymerization, for example, as disclosed by Heimberg, U.S. Pat. No. 4,287,329, and by Heimberg et al., copending U.S. patent applicationn filed herewith.

In another embodiment of this invention, the saturated elastomer can be an acrylate ester elastomer also containing vinyl chloroacetate cure sites and vulcanizable by soap/sulfur cure systems. Such elastomers are based principally on poly(ethyl acrylate) and copolymers of ethyl acrylate with n-butyl acrylate. The acrylate ester polymers that may be advantageously vulcanized using the soap/sulfur cure systems of the invention possess highly reactive cure sites. The cure sites are haloacetoxy groups introduced into the polymer during synthesis by co- or terpolymerizing a vinyl haloacetate, such as vinyl chloroacetate, with the other monomer(s). For example, VCA cure sites are introduced into acrylate ester polymers by copolymerization (see U.S. Pat. No. 3,201,373).

EVA and acrylate ester elastomers of the above types will contain from about 0.06 to about 2.4 weight percent halogen (e.g., chlorine) and, more generally, from about 0.3 to about 1.5 weight percent halogen.

Conventional soap/sulfur cure systems known to the art are employed. The sulfur employed is preferably in the elemental form such as the ground sulfur of commerce, especially ground rhombic sulfur crystals, however, sulfur compounds capable of liberating sulfur at vulcanizing temperatures may also be used either alone or in combination with the elemental sulfur. Such sulfur compounds include tetramethylthiuram disulfide and its homologs, the corresponding tetrasulfide, dipentamethylene thiuram hexasulfide, 4,4'-dithiobismorpholine, sulfur chlorides, and the like. Sulfur compounds should be soluble in the polymer or available in a finely divided form so they can be readily and uniformly dispersed in the polymer.

The elemental sulfur is employed in an amount from about 0.05 to about 2.5 phr and, more usually, from about 0.2 to about 1.3 phr. Equivalent amounts of sulfur compounds may be employed based on the sulfur contents of said compounds. It is not completely clear what role sulfur plays in soap/sulfur vulcanization. DeMarco, in *Rubber Chem. and Tech.*, 52, 173(1979), lists sulfur as an accelerator. On other hand Kaendler, Peschk and Woess (*Angew. Makromol. Chem.* 29/30, No. 351, p. 241(1973)) indicate that sulfur crosslinks ($-S_x-$) are formed in soap/sulfur cures. In any event the present invention is not restricted to any particular mechanism of vulcanization.

Conventional alkali metal or ammonium soaps (salts) of linear or branched, saturated or unsaturated, mono- or dicarboxylic acids are employed for the soap/sulfur cure systems utilized herein. The carboxylic acids will contain from about 5 to 22 carbon atoms. Mixtures of these carboxylic acids may also be advantageously employed. Examples of acids from which useful soaps can be derived are caproic acid, 2-ethylhexanoic acid, pelargonic acid, capric acid, lauric acid, coconut fatty acid, myristic acid, palmitic acid, oleic acid, stearic acid, tallow fatty acids, soya fatty acids, adipic acid, azelaic acid, sebacic acid, and the like.

The sodium or potassium soaps of monocarboxylic acids are most generally employed for soap/sulfur vulcanization. While soap/sulfur cure systems based on soaps of monocarboxylic acids having from 5 to about 10 carbon atoms can be used alone or in combination with the phase transfer compound to reduce vulcanization temperature and/or reduce the amount of cure sites, soap, and/or sulfur required to achieve acceptable vulcanization, the phase transfer compounds are most advantageously used with soaps of monocarboxylic acids containing from about 12 to about 22 carbon atoms which are relatively sluggish in soap/sulfur cure systems and which heretofore have not given the fastest vulcanization. Thus, it is possible with the present invention using soaps of higher fatty acids to achieve cure rates that compare favorably with those observed with the so-called "fast" soap/sulfur vulcanizations obtained, for example, using sodium 2-ethylhexanoate. Since 2-ethylhexanoic acid is comparatively expensive, as compared to the higher fatty acids such as oleic acid, stearic acid and mixed fatty acids derived from fats and oils and since sodium 2-ethylhexanoate is hygroscopic and requires handling under comparatively anhydrous conditions, it is highly advantageous to use the higher fatty acid soaps for soap/sulfur vulcanization. The inclusion of a phase transfer compound with the soap/sulfur cure system makes it possible to utilize the higher fatty acid soaps. From about 0.5 to about 7 phr soap is employed. Most generally, from about 2 to about 5 phr soap is used for the compositions and process of this invention.

The polymers to be vulcanized are typically compounded on a 2-roll rubber mill. The compounding temperature is maintained in the range of from about 140° to about 170° F. Temperatures above about 180° F. are generally to be avoided during compounding. Compounding times generally do not exceed about 25 minutes. Other compounding equipment may be used, e.g., a Banbury mixer, a twin screw processor and the like, but a 2-roll rubber mill is preferred.

Conventional compounding ingredients can be included with the phase transfer compound, sulfur and carboxylic acid soap. Various antioxidants can be used in soap/sulfur vulcanization; e.g., phenyl-beta-naphthylamine, di-beta-napthyl-p-phenylene diamine, Agerite Resin D (trademark), and the like. Various filler/reinforcing agents may also be incorporated into the elastomer composition although it is within the scope of the invention to vulcanize unfilled compositions. Examples of filler/reinforcing agents include carbon black; e.g., furnace blacks, channel blacks, thermal blacks, and the like. Specified types of carbon blacks are fast extruding furnace (FEF) black and high abrasion furnace (HAF) black. Other common filler/reinforcing agents which may be employed include silica, alumina, clays, diatomaceous earth, barium sulfate, glass fibers and the like. Long chain monocarboxylic (fatty) acids may also be included as a lubricant/cure retarder. The monocarboxylic acids typically contain from about 6 to about 22 carbon atoms, may be linear or branched, and may be saturated or contain one or more carbon-carbon double bonds. $C_{12-18}$ fatty acids and mixtures of said acids are particularly useful. Examples of useful monocarboxylic acids include: lauric acid, myristic acid, palmitic acid, oleic acid, linoleic acid, stearic acid, isostearic acid, behenic acid, and the like.

In general, the best strength properties are achieved where about 30 to about 60 phr filler is employed; however, this value is only a guideline and from about 25 to about 100 phr filler may be employed for certain applications.

In addition to the antioxidant, the filler/reinforcing agents, and the fatty acid lubricant/cure retarder the polymers of this invention may also be compounded with stabilizers and other agents for various purposes; e.g., plasticizers, flame retardants, reinforcement promoters and the like, all of which are known in the art.

In one embodiment of the invention, ethyl acrylate copolymers and terpolymers and EVA copolymers and terpolymers containing α-chloroacetoxy groups and 0.3 to 1.5 percent chlorine are formulated with 0.5 to 4 phr phase transfer compound; 0.2 to 1.3 phr sulfur; 2 to 5 phr sodium or potassium soap of a $C_{5-22}$ monocarboxylic acid or mixture of $C_{5-22}$ monocarboxylic acids; 0.25 to 1.5 phr antioxidant; 1 to 3 phr $C_{12-18}$ fatty acid or mixture of $C_{12-18}$ fatty acids; 30 to 60 phr carbon black; and vulcanized.

In yet another embodiment of the invention, the phase transfer compound is mixed with the soap component of the cure system and a portion of the carbon black reinforcing agent, usually an amount essentially equivalent to the conbined amount of the soap and phase transfer compound, and this mixture added to the elastomer as the final step in the compounding operation. Other compounding ingredients of the formulation, including the sulfur and the bulk of the carbon black, are blended into the elastomer prior to addition of the premix containing the phase transfer compound and carboxylic acid soap. The elastomers of this invention in combination with the phase transfer compound and soap/sulfur mixtures are cured by applying heat thereto until the desired degree of crosslinking is achieved. Cure temperatures will generally be on the order of from about 100° C. to about 250° C. The preferred temperature range is from about 130° C. to about 200° C. The sure time depends on the cure temperature, i.e., where high temperatures are employed the time required to develop optimal physical properties of the vulcanizate will be shorter than when the polymer is vulcanized at lower temperatures. However, vulcanization time will usually be on the order from about 1 to about 150 minutes. Cure times of from about 3 to about 30 minutes are preferred. The vulcanized elastomers of this invention find utility as gaskets, seals, spark plug boots, hoses, and the like.

The invention is illustrated in the examples that follow. In these examples, chlorine contents were determined by the Schoninger method. Tensile strength and elongation of the sulfur vulcanized elastomers were determined according to ASTM D 412.

EXAMPLE I

A commercially available acrylate ester elastomer, Cyanacryl R (trademark) manufactured by American Cyanamid Co., was vulcanized in accordance with the present invention using a soap/sulfur cure system in conjunction with a phase transfer compound. The acrylate ester elastomer is an ethyl acrylate-vinyl chloroacetate copolymer containing approximately 0.9 weight percent chlorine having a Mooney viscosity, ML (1+4) at 100° C., of 38 (ASTM Method D 1646-68). The phase transfer compound used was myristyltrimethylammonium bromide (MTMAB). The elastomer composition was formulated as follows:

|  | Parts |
| --- | --- |
| Ethyl Acrylate-Vinyl Chloroacetate Elastomer | 100 |
| Agerite Resin D (trademark)* | 1.0 |
| Sulfur | 0.3 |
| Stearic Acid | 2.0 |
| Carbon Black** | 46.0 |
| Mixture of: | |
| Carbon Black** | 4.0 |
| Red Oil Soap*** | 4.0 |
| MTMAB | 0.1 |

*polymerized 1,2-dihydro-2,2,4-trimethylquinoline manufactured by R. T. Vanderbilt Co., Inc.
**N 550 fast extruding furnace (FEF) black manufactured by Phillips Petroleum Co.
***Sodium oleate manufactured by National Purity Soap and Chemical Co.

The ingredients were milled into the elastomer in the order shown. A standard 2-roll laboratory rubber mill (2.5" diameter rolls) was used. Total milling time at 140° F. was 20 minutes and the mixture of carbon black, red oil soap, and MTMAB was added near the end of the milling period. A control formulation containing all of the ingredients except the phase transfer catalyst (MTMAB) was similarly prepared. Specimens of both compositions were then vulcanized in a press at 170° C. for 3, 7, 15, and 30 minutes. Tensile strength (psi) and elongation (%) values of the cured specimens were as follows:

|  | Tensile/Elongation | Tensile/Elongation (Control) |
| --- | --- | --- |
| 3 min. | 1520/420 | 1140/490 |
| 7 min. | 2000/310 | 1780/300 |
| 15 min. | 2000/280 | 1970/270 |

-continued-

|  | Tensile/Elongation | Tensile/Elongation (Control) |
| --- | --- | --- |
| 30 min. | 1880/280 | 2080/280 |

From a comparison of the physical properties of the control with those of the formulation of the present invention, it is evident that the tensile strength builds faster when the phase transfer catalyst is present, as judged by the 3-minute cure values. It is further apparent that when using a soap/sulfur cure system based on a higher fatty acid the time required to obtain optimal physical properties is effectively halved by the addition of only 0.1 phr of the phase transfer compound to the formulation. Cure rates can be enhanced even further by increasing the amount of the phase transfer compound in the formulation. Comparable results are obtained when the corresponding phosphonium compound (myristyltrimethyl phosphonium bromide) is substituted for the MTMAB.

EXAMPLE II

To demonstrate the ability to increase the amount of phase transfer catalyst and further enhance the cure rate, the following formulation was prepared:

|  | Parts |
| --- | --- |
| Ethyl Acrylate-Vinyl Chloroacetate Elastomer | 100 |
| Agerite Resin D (trademark) | 1.0 |
| Sulfur | 0.3 |
| Stearic Acid | 2.0 |
| Carbon Black | 46.0 |
| Mixture of: | |
| Carbon Black | 4.0 |
| Red Oil Soap | 4.0 |
| MTMAB | 3.0 |

The milling and curing procedures were the same as described for the composition of Example I. Tensile and elongation values obtained were as follows:

|  | Tensile/Elongation |
| --- | --- |
| 3 min. | 1850/190 |
| 7 min. | 1560/150 |
| 15 min. | 1600/120 |
| 30 min. | 1520/110 |

It is apparent upon comparison of the 3-minute cure values with the values obtained in Example I that the soap/sulfur vulcanization process is much accelerated by increasing the amount of the phase transfer compound. In fact, some rippling was evident in the cured specimen which would indicate that optimal cure was obtained at slightly less than 3 minutes. Thus, by the process of this invention, it is possible to shorten cure times or, if desirable, to reduce the temperature of cure and still obtain acceptable vulcanization.

EXAMPLE III

The versatility of the process and the ability to increase the amount of sulfur is demonstrated by the following example wherein an elastomer was formulated as follows:

|  | Parts |
| --- | --- |
| Ethyl Acrylate-Vinyl Chloroacetate Elastomer | 100 |
| Agerite Resin D (trademark) | 1.0 |
| Sulfur | 0.8 |
| Stearic Acid | 2.0 |
| Carbon Black | 46.0 |
| Mixture of: | |
| Carbon Black | 4.0 |
| Sodium Oleate | 4.0 |
| MTMAB | 0.1 |

For this experiment, the premix of carbon black, sodium oleate and MTMAB was the final ingredient milled into the elastomer. Mill temperature was maintained at 160°–170° F. and total milling time was 20 minutes. The compounded elastomer was easily removed from the mill and specimens were cured at 170° C. using the standard procedure. The vulcanizate had the following tensile and elongation values:

|  | Tensile/Elongation |
| --- | --- |
| 3 min. | 1880/220 |
| 7 min. | 1840/160 |
| 15 min. | 1820/150 |
| 30 min. | 1750/140 |

Comparable results are obtained using E/VA/VCA terpolymers containing 67.3 weight percent VA and 0.91% Cl. and 62.9 weight percent VA and 0.77% Cl. in the above formulation.

EXAMPLE IV

Example III was repeated except that the amount of phase transfer compound was increased. The formulation was as follows:

|  | Parts |
| --- | --- |
| Ethyl Acrylate-Vinyl Chloroacetate Elastomer | 100 |
| Agerite Resin D (trademark) | 1.0 |
| Sulfur | 0.8 |
| Stearic Acid | 2.0 |
| Carbon Black | 46.0 |
| Mixture of: | |
| Carbon Black | 4.0 |
| Sodium Oleate | 4.0 |
| MTMAB | 3.0 |

Physical properties of the vulcanizate were as follows:

|  | Tensile/Elongation |
| --- | --- |
| 3 min. | 1830/300 |
| 7 min. | 2040/240 |
| 15 min. | 2080/280 |
| 30 min. | 2100/230 |

It is evident from the foregoing that acceptable vulcanization was obtained. Moreover, acceptable vulcanizates are also obtained when methyltrialkyl ($C_8$–$C_{10}$) ammonium chloride is employed as the phase transfer compound.

EXAMPLE V

To demonstrate the ability to use a polyalkylene oxide for the vulcanization of an acrylate elastomer by the red oil soap/sulfur cure system the following experiment was conducted. Polyethylene glycol (molecular weight 200) was the phase transfer compound used. The ingredients used for the formulation and a control composition were as follows:

|  | Parts | Control |
| --- | --- | --- |
| Ethyl Acrylate/Vinyl Chloroacetate Elastomer | 100 | 100 |
| Agerite Resin D (trademark) | 1.0 | 1.0 |
| Sulfur | 0.3 | 0.3 |
| Stearic Acid | 2.0 | 2.0 |
| Carbon Black | 46.0 | 46.0 |
| Polyethylene Glycol | 3.0 | — |
| Premix of: | | |
| Carbon Black | 4.0 | 4.0 |
| Red Oil Soap | 4.0 | 4.0 |

The ingredients were milled into the elastomer in the order shown except that the polyethylene glycol and carbon black were alternately added in small increments. The carbon black/red oil soap mixture was added last. Both compositions were milled for 20 minutes. The mill temperature used for the composition of the invention was 150° F. whereas the control was milled at 170°–175° F. Both compositions were easily removed from the mill and there was no evidence of scorching. Physical properties obtained after vulcanization (170° C.) were as follows:

|  | Tensile/Elongation | Tensile/Elongation (Control) |
| --- | --- | --- |
| 3 min. | 1880/280 | 1140/490 |
| 7 min. | 1870/260 | 1780/300 |
| 15 min. | 1760/240 | 1970/270 |
| 30 min. | 1900/250 | 2080/280 |

The higher tensile strengths and lower percent elongations obtained at the shorter cure times with the compositions of the invention are again seen as evidence of useful acceleration of the red oil soap/sulfur cure systems by the addition of a phase transfer compound. Although the invention has been described by reference to some embodiments, it is not intended that the compositions and process for vulcanizing the elastomers be limited thereto. Other modifications are intended to be included as falling within the spirit and scope of the foregoing disclosure and the following claims.

We claim:
1. A composition of matter comprising
   (a) a saturated elastomer having active halogen-containing cure sites;
   (b) a soap/sulfur cure system consisting of 0.5 to 7 phr alkali metal or ammonium soap of a mono- or dicarboxylic acid having from 5 to 22 carbon atoms and 0.05 to 2.5 phr sulfur; and
   (c) 0.5 to 4 phr phase transfer compound selected from the group consisting of quaternary ammonium or phosphonium salts of mineral acids corresponding to the formula

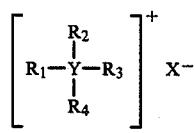

wherein Y is nitrogen or phosphorus, $R_1$, $R_2$, $R_3$, and $R_4$ are hydrocarbon radicals having from 1 to 18 carbon atoms, and $X^-$ is $Cl^-$, $Br^-$, $I^-$, $HSO_4^-$, or $H_2PO_4^-$ and polyalkylene oxide containing repeating oxyalkylene moieties of the formula

where R is an alkylene group having from 2 to 4 carbon atoms, n is an integer from 3 to 1000, and terminated with hydroxyl or lower alkoxy groups having from 1 to 5 carbon atoms.

2. The composition of claim 1 wherein the saturated elastomer is a copolymer of ethylene and a vinyl ester of from 3 to 6 carbon atoms having active halogen-containing cure sites incorporated therein by polymerizing a vinyl monomer containing said halogen-containing group or by chemically modifying the copolymer by reacting a portion of the ester groups with a halogen-containing reagent.

3. The composition of claim 2 wherein said saturated elastomer is obtained by terpolymerizing 25 to 60 percent by weight ethylene, 35 to 70 percent by weight vinyl acetate, and 0.2 to 8 percent by weight of an active halogen-containing cure site monomer.

4. A composition of claim 3 wherein the active halogen-containing cure site monomer is vinyl chloroacetate and the elastomer contains from 0.06 to 2.4 weight percent chlorine.

5. The composition of claim 1 wherein the saturated elastomer is poly(ethyl acrylate) or a copolymer of ethyl acrylate with n-butyl acrylate and having active halogen-containing cure sites incorporated therein by copolymerizing or terpolymerizing a vinyl monomer containing said halogen-containing group.

6. The composition of claim 5 wherein said saturated elastomer is obtained by copolymerizing or terpolymerizing 0.2 to 8 percent by weight of an active halogen-containing cure site monomer.

7. The composition of claim 6 wherein the active halogen-containing cure site monomer is vinyl chloroacetate and the elastomer contains from 0.06 to 2.4 weight percent chlorine.

8. The composition of any one of claims 1, 2, 3, 4, 5, 6, or 7 wherein the soap is a sodium or potassium soap of a $C_{5-22}$ aliphatic monocarboxylic acid.

9. The composition of claim 8 wherein the phase transfer compound is a quaternary ammonium salt and the soap is the sodium soap of a $C_{12-22}$ aliphatic monocarboxylic acid.

10. The composition of claim 9 which contains from about 25 to about 100 phr filler/reinforcing agent.

11. The composition of claim 10 wherein the filler/reinforcing agent is carbon black present in an amount from about 30 to about 60 phr.

12. A composition of matter consisting of an elastomer selected from the group consisting of ethylene-vinyl acetate copolymers and ethyl acrylate homopolymers and copolymers, said elastomers containing α-chloroacetoxy groups and 0.3 to 1.5 weight percent chlorine; 0.5 to 4 phr quaternary ammonium salt of a mineral acid corresponding to the formula

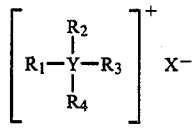

wherein Y is nitrogen or phosphorus, $R_1$, $R_2$, $R_3$, and $R_4$ are hydrocarbon radicals having from 1 to 18 carbon atoms, and $X^-$ is $Cl^-$, $Br^-$, $I^-$, $HSO_4^-$, or $H_2PO_4^-$; 0.2 to 1.3 phr sulfur; 2 to 5 phr sodium or potassium soap of a $C_{5-22}$ monocarboxylic acid or mixture of $C_{5-22}$ monocarboxylic acids; 0.25 to 1.5 phr antioxidant; 1 to 3 phr $C_{12-18}$ fatty acid or mixture of $C_{12-18}$ fatty acids; and 30 to 60 phr carbon black.

13. A composition of matter consisting of an elastomer selected from the group consisting of ethylene-vinyl acetate copolymers and ethyl acrylate homopolymers and copolymers, said elastomers containing α-chloroacetoxy groups and 0.3 and 1.5 weight percent chlorine; 0.5 to 4 phr polyalkylene oxide having repeating oxyalkylene moieties of the formula

where R is an alkylene group having from 2 to 4 carbon atoms, n is an integer from 3 to 1000, and terminated with hydroxy or lower alkoxy groups having from 1 to 5 carbon atoms; 0.2 to 1.3 phr sulfur; 2 to 5 phr sodium or potassium soap of a $C_{5-22}$ monocarboxylic acid or mixture of $C_{5-22}$ monocarboxylic acids; 0.25 to 1.5 phr antioxidant; 1 to 3 phr $C_{12-18}$ fatty acid or mixture of $C_{12-18}$ fatty acids; and 30 to 60 phr carbon black.

14. A process for vulcanizing a saturated elastomer having active halogen-containing cure sites which comprise combining said elastomer with 0.5 to 7 phr alkali metal or ammonium soap of a mono- or dicarboxylic acid having from 5 to 22 carbon atoms, 0.05 to 2.5 phr sulfur and 0.05 to 4 phr phase transfer compound selected from the group consisting of quaternary ammonium or phosphonium salts of mineral acids corresponding to the formula

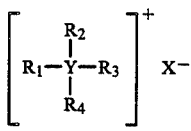

wherein Y is nitrogen or phosphorus, $R_1$, $R_2$, $R_3$, and $R_4$ are hydrocarbon radicals having from 1 to 18 carbon atoms, and $X^-$ is $Cl^-$, $Br^-$, $I^-$, $HSO_4^-$ or $H_2PO_4^-$ and polyalkylene oxides containing repeating oxyalkylene moieties of the formula

where R is an alkylene group having from 2 to 4 carbon atoms, n is an integer from 3 to 1000, and terminated with hydroxyl or lower alkoxy groups having from 1 to 5 carbon atoms and heating said mixture at a temperature from about 100° C. to about 250° C. to effect vulcanization.

15. The process of claim 14 wherein the saturated elastomer is selected from the group consisting of copolymers of ethylene and a vinyl ester of from 3 to 6 carbon atoms and having active halogen-containing cure sites incorporated therein by polymerizing a vinyl monomer containing said halogen-containing group or by chemically modifying the copolymer by reacting a portion of the ester groups with a halogen-containing reagent and poly(ethyl acrylate) or a copolymer of ethyl acrylate with n-butyl acrylate and having active halogen-containing cure sites incorporated therein by copolymerizing or terpolymerizing a vinyl monomer containing said halogen-containing group.

16. The process of claim 15 wherein the soap is a sodium or potassium soap of a $C_{5-22}$ aliphatic monocarboxylic acid and the phase transfer compound is a quaternary ammonium salt.

17. The process of claim 16 wherein the vulcanization is carried out at a temperature from 130° C. to 200° C.

18. The process of claim 17 wherein the elastomer contains α-chloroacetoxy groups and 0.3 to 1.5 weight percent chlorine selected from the group consisting of ethylene-vinyl acetate copolymers and ethyl acrylate homopolymers and copolymers.

19. The process of claim 18 wherein the saturated elastomer contains 25 to 100 phr filler/reinforcing agent and 2 to 5 phr sodium or potassium soap of a $C_{12-22}$ aliphatic monocarboxylic acid.

20. The process of claim 19 wherein the saturated elastomer contains 0.5 to 4 phr phase transfer compound, 0.2 to 1.3 phr sulfur, 0.25 to 1.5 phr antioxidant, 1 to 3 phr $C_{12-18}$ fatty acid or mixture of $C_{12-18}$ fatty acids, and 30 to 60 phr carbon black.

* * * * *